(12) United States Patent
Steinmetz et al.

(10) Patent No.: US 8,794,705 B2
(45) Date of Patent: Aug. 5, 2014

(54) HEADREST FOR VEHICLE SEATS

(75) Inventors: Rolf Steinmetz, Düsseldorf (DE);
Richard Hielckert, Marktsteft (DE)

(73) Assignees: Johnson Controls Metals and Mechanisms GmbH & Co. KG, Solingen (DE); Grammer Automotive CZ s.r.o., Dubice (CZ)

( * ) Notice: Subject to any disclaimer, the term of this patent is extended or adjusted under 35 U.S.C. 154(b) by 0 days.

(21) Appl. No.: 13/249,907

(22) Filed: Sep. 30, 2011

(65) Prior Publication Data
US 2012/0080925 A1 Apr. 5, 2012

(30) Foreign Application Priority Data
Oct. 1, 2010 (DE) .......................... 10 2010 041 878

(51) Int. Cl.
A47C 7/36 (2006.01)

(52) U.S. Cl.
USPC .......................................................... 297/410

(58) Field of Classification Search
CPC ..................................................... B60N 2/4817
USPC .................................................. 297/410, 391
See application file for complete search history.

(56) References Cited

U.S. PATENT DOCUMENTS

| | | | | |
|---|---|---|---|---|
| 5,733,009 A * | 3/1998 | De Filippo | .................... | 297/391 |
| 5,992,939 A | 11/1999 | Gass et al. | | |
| 7,562,936 B1 * | 7/2009 | Veine et al. | .................... | 297/410 |
| 7,575,282 B2 | 8/2009 | Sutter, Jr. | | |
| 7,735,929 B2 * | 6/2010 | Veine et al. | .................... | 297/410 |
| 2005/0280305 A1 * | 12/2005 | Gurtatowski et al. | ......... | 297/410 |
| 2009/0058163 A1 * | 3/2009 | Bokelmann et al. | .......... | 297/410 |
| 2009/0184557 A1 * | 7/2009 | Runde | ........................... | 297/410 |
| 2009/0224590 A1 * | 9/2009 | Becker et al. | ................. | 297/410 |

FOREIGN PATENT DOCUMENTS

| | | |
|---|---|---|
| CN | 1930020 A | 3/2007 |
| DE | 36 36 932 C1 | 3/1988 |
| DE | 89 09 637.1 U1 | 11/1989 |
| DE | 198 41 648 A1 | 4/1999 |
| DE | 199 54 862 A1 | 8/2000 |
| DE | 199 54 862 C2 | 8/2000 |

(Continued)

OTHER PUBLICATIONS

Machine generated English translation for: DE 102005043811B4, Grammer AG, Jul. 26, 2007.*

*Primary Examiner* — David R Dunn
*Assistant Examiner* — Alexander Harrison
(74) *Attorney, Agent, or Firm* — Flaster/Greenberg P.C.

(57) ABSTRACT

The invention relates to a headrest for motor vehicle seats, comprising an upholstery support (2), a support rod (3) displaceably arranged relative to the upholstery support (2), connecting the headrest (1) to a backrest of the motor vehicle seat and at least two bearing elements (4) arranged in the longitudinal axial direction of the support rod (3), spaced apart from one another on the upholstery support (2) and at least partially encompassing the support rod (3), for guiding the support rod (3), the bearing elements (4) being elastically pretensioned in the direction of the support rod (3). In order to provide a headrest which permits a rattle-free arrangement of the upholstery support on the support rod and which has easy adjustability, it is provided that the bearing elements (4) comprise guide webs (20) distributed over their inner periphery, protruding toward the support rod (3) and extending in the longitudinal axial direction of the support rod (3).

12 Claims, 13 Drawing Sheets

(56) References Cited

FOREIGN PATENT DOCUMENTS

| DE | 101 51 360 A1 | 4/2003 |
| DE | 10 2005 043 811 A1 | 5/2006 |
| DE | 20 2005 043 811 B4 | 7/2007 |
| DE | 20 2007 007 111 U1 | 10/2007 |

* cited by examiner

HEADREST FOR VEHICLE SEATS

BACKGROUND OF THE INVENTION

1. Field of the Invention

The invention relates to a headrest for motor vehicle seats, comprising:
- an upholstery support,
- a support rod displaceably arranged relative to the upholstery support, connecting the headrest to a backrest of the motor vehicle seat and
- at least two bearing elements arranged in the longitudinal axial direction of the support rod, spaced apart from one another on the upholstery support and at least partially encompassing the support rod, for guiding the support rod, the bearing elements being elastically pretensioned in the direction of the support rod.

2. Description of Related Art

In headrests of the aforementioned type, the upholstery support firstly serves for receiving an upholstered portion, as is known from a plurality of motor vehicles, and secondly serves to adjust the headrest relative to the support rods connected to a backrest of the motor vehicle seat, in order to permit in this manner an adaptation of the headrest to the occupants seated on the motor vehicle seat. To this end, the upholstery support is connected in an adjustable manner to the support rods.

Due to unavoidable manufacturing tolerances of the support rods and of the receivers arranged on the upholstery support for arranging the support rods, known headrests with adjustable upholstery supports have the drawback that the upholstery support is connected to the support rods with play. As a result, this may lead to rattling noise during travel which is perceived as troublesome by the occupants. To solve this problem, manufacture without play is only able to be implemented by a considerable manufacturing outlay and, moreover, has the drawback that such an embodiment results in a high expenditure of force for adjusting the headrest.

Proceeding therefrom, the object of the invention is to provide a headrest which permits a rattle-free arrangement of the upholstery support on the support rod, and which has easy adjustability.

BRIEF SUMMARY OF THE INVENTION

The object is achieved by the invention by a headrest having the features of claim 1. Advantageous developments of the headrest are set forth in the dependent claims.

For guiding the upholstery support on the support rod, said support has elastically pretensioned bearing elements partially resting against the support rod. It is a feature of the headrest according to the invention that said bearing elements comprise guide webs distributed over their inner periphery, protruding toward the support rod and extending in the longitudinal axial direction of the support rod. In this case, at least two bearing elements are arranged in the longitudinal axial direction of the support rod, spaced apart from one another on the upholstery support, and which at least partially encompass the support rod, i.e. they are arranged partially coaxially relative to the support rod, so that the guide webs, which are distributed over the periphery of the support rod, rest in an elastically displaceable manner against the support rod as a result of the elastic pretensioning.

The guide webs themselves are in this case not configured to be elastic so that the pretensioning solely results from the pretensioning of the bearing elements and not from an elastic deformation of the guide webs. The resting of the guide webs against the support rod ensures reliable guidance as a result of the existing pretensioning, in addition to a rattle-free arrangement of the upholstery support on the support rod, the alignment of the guide webs extending parallel to the support rod, in particular, ensuring correct linear guidance. Thus in a particularly reliable manner it is achieved that, in addition to a rattle-free arrangement, only a small expenditure of force is required in order to adjust the upholstery support relative to the support rods.

A further characteristic of the headrest according to the invention is that the bearing elements are formed by an annular body comprising an opening or respectively a recess, the annular body being preferably connected in its region opposing the opening to a frame element which can be connected to the upholstery support. An annular body provided with an opening or respectively recess represents a particularly simple embodiment of an elastically adjustable bearing element. The elasticity of the limbs formed by the opening continuously increases in the direction of the free ends of the limbs, i.e. in the direction of the opening.

The connection of the annular body to the frame element, which may also be configured to be continuous, permits the bearing element to be positioned in a particularly simple manner at a suitable point on the upholstery support, so that due to the pretensioning the annular body rests, at the same time, in an elastically adjustable manner against the support rod with the guide webs. The design of the bearing element as an annular body thus represents a particularly simple embodiment which permits an elastic pretensioning of the guide webs arranged on the annular body. In the case of the embodiment, according to which the annular body and the bearing element are not continuous but only connected in the region opposing the opening, due to the elasticity which increases with the increasing distance from the connecting region of the annular body to the frame element, the guide webs are positioned in a suitable manner on the annular body by taking this feature into account. This development of the invention is characterized, in particular, in that it provides a particularly cost-effective embodiment of the bearing element which, moreover, ensures the guidance of the upholstery support with a high degree of reliability.

The choice of the means for pretensioning the bearing elements is, in principle, freely selectable. According to a particularly advantageous embodiment of the invention, however, the bearing element is pretensioned by a spring element acting externally thereon in the direction of the support rod. The use of a spring element is characterized here in that it ensures a particularly cost-effective and reliable pretensioning of the bearing element. The spring element is configured here such that in the case of its existing arrangement externally on the bearing element, it reliably pretensions the bearing element in the direction of the support rod, so that the guide webs arranged on the bearing element reliably rest against the support rod. In a particularly advantageous manner, in this case the spring element is formed by a bow spring, which at least partially encompasses the bearing element, and is preferably arranged in corresponding grooves and pretensioned in the direction of the support rod, where it rests against said support rod. The bow spring is specifically characterized here by its low manufacturing costs and thus the possibility of producing the headrest in a particularly cost-effective manner.

According to the invention, it is provided that two bearing elements placed spaced apart from one another are arranged on the upholstery support, viewed in the longitudinal axial direction of the support rod. According to a particularly advantageous embodiment of the invention, in this case the bearing elements are arranged offset by 180° relative to one another. In the case of the use of identical bearing elements, in which the bearing elements are rotated by 180° and/or are installed tilted relative to one another, the offset arrangement permits the upholstery support to be guided in a particularly reliable and rattle-free manner on the support rod. In particular, when using an annular body provided advantageously and comprising an opening, due to the arrangement offset by 180° relative to one another, this embodiment permits compensation for the elasticity of the annular body which changes depending on the spacing of the opening.

In particular, in the case of the embodiment provided according to an advantageous development of the invention, according to which the bearing element on its inner periphery has four guide webs, the annular body preferably comprising two guide webs arranged adjacent to the opening as well as two guide webs arranged adjacent to the connecting region with the frame element, which are particularly preferably arranged in a uniformly distributed manner, in the case of an arrangement offset by 180° relative to one another a uniform guidance of the support rod may be ensured. This is the case, in particular, when the guide webs are arranged substantially at a uniform distance from one another on the inner periphery of the annular body and at a uniform distance from the opening or respectively the connecting region with the frame element. Although the number of the guide webs to be used is freely selectable the four guide webs preferably provided offer particularly reliable guidance with easy adjustability of the upholstery support relative to the support rod at the same time.

According to a further embodiment of the invention, the spring element has a stop region which protrudes in the direction of the support rod such that it cooperates in an upper end position of the headrest with an end stop arranged on the support rod. According to this embodiment of the invention, in addition to the pretensioning of the bearing element in the direction of the support rod, the spring element serves to prevent an adjustment of the headrest in which said headrest is removed from the support rods. In this case, the upper end stop of the headrest determines the maximum adjustability of the headrest relative to the backrest, i.e. the highest possible adjustable position. In this position, a region, namely the stop region of the spring element, cooperates with an end stop arranged on the support rod, and reliably prevents a displacement beyond this position. This embodiment of the invention permits further components for securing against displacement, which prevents undesirable adjustment beyond the maximum end position, to be dispensed with.

The embodiment of the guide webs resting against the support rod may, in principle, be of any kind, the guide webs nevertheless being of arcuate configuration in cross section according to an advantageous development of the invention. Accordingly, the guide webs may have a concave cross section which permits the guide webs to rest in a planar manner against the support rod. Alternatively, one, several or all of the guide webs may also have a convex cross section, as a result of which the guide webs come into contact with the support rods in a linear manner, which in the case of guidance without play permits a particularly easy adjustability of the upholstery support relative to the support rod.

The bearing elements may, in principle, be arranged in any manner on the upholstery support. Thus said bearing elements may be inserted individually at positions provided therefor in the upholstery support, positioning without play being very important in order to ensure the guidance or respectively arrangement of the upholstery support on the support rods without play and thus without rattling. According to one possible embodiment, the bearing elements are of U-shaped configuration and are arranged in a clamped manner on the upholstery support so that the guide webs are displaceable, namely elastically, relative to the support rod, but otherwise no relative movements of the bearing element relative to the upholstery support occur which could lead to rattling noise.

According to a particularly advantageous embodiment of the invention, the bearing elements are arranged on a bearing bush which may be connected by a positive and/or material connection to the upholstery support. According to this embodiment of the invention, the preferably one-piece bearing bush comprises the two bearing elements which are arranged spaced apart from one another, so that said bearing elements may be arranged together by an arrangement of the bearing bush at a position on the upholstery support provided therefor. In this case, a positive and/or material connection ensures in a particularly reliable manner an accurate positioning of the bearing elements and effectively prevents said bearing elements from being displaced relative to the upholstery support in the installed position.

For the positive connection of the upholstery support to the bearing bush, for example, latching grooves or latching projections may be used, which engage in a correspondingly configured receiver on the upholstery support. For the material connection, for example, adhesives may be used which fix the bearing bush to the upholstery support or respectively in an opening on the upholstery support. In a particularly advantageous manner, the bearing bush is formed here from a plastics part.

According to a further embodiment of the invention, the support rod in the region of its free end comprises a projection having an end stop and protruding from the support rod, and which is displaceably mounted in a corresponding receiver on the upholstery support. According to this embodiment of the invention, a projection protruding radially from the surface of the support rod is arranged at one free end of the support rod, namely at the end of the support rod opposing the backrest. Said projection firstly has an end stop which may be brought into engagement in the upper end position with the stop region of the spring element. Moreover, the projection permits the support rod to be secured against rotation on the upholstery support, the projection being displaceably mounted in a corresponding receiver on the upholstery support. The receiver may, for example, be formed by a groove incorporated in the upholstery support, into which the projection engages in the installed position of the upholstery support on the support rod. This embodiment of the invention permits a securing against rotation and permits the end position to be secured in a particularly cost-effective and simple manner.

For fixing the position of the headrest, i.e. the position of the upholstery support on the support rod, in principle any latching means or the like may be provided. According to a particularly advantageous embodiment of the invention, however, a locking spring arranged on the upholstery support rests against the support rod with a latching portion, which is pretensioned in the direction of the support rod, such that the latching portion may be brought into engagement with a latching mark arranged on the support rod.

For fixing the position of the headrest relative to a backrest or respectively on the support rods, viewed in the longitudinal direction said support rods have latching marks arranged spaced apart from one another. For locking the headrest to one of the latching marks, the locking spring is arranged on the upholstery support and which, due to its pretensioning in the direction of the support rod, engages in the latching marks and then prevents at least a relocation of the headrest in the direction of the backrest. In a latched position, the latching portion of the locking spring rests in the latching mark. Depending on the design of the latching mark, security against displacement may also be achieved in a direction opposing the backrest.

The embodiment of the actuation of the locking spring so that said locking spring comes out of engagement with the latching mark for further displacement may, in principle, be of any configuration. According to a particularly advantageous embodiment of the invention, however, the locking spring rests against an unlocking slide which is configured such that an axial displacement of the unlocking slide causes the locking spring to shift from a latched position into a released position. This embodiment of the invention permits a particularly simple actuation of the locking spring, for example, by actuating an actuating knob which is connected to the unlocking slide so that the actuation thereof effects a displacement.

BRIEF DESCRIPTION OF THE SEVERAL VIEWS OF THE DRAWINGS

Exemplary embodiments of the invention are explained hereinafter with reference to the drawings, in which:

FIG. 9b shows a perspective view of the one-piece bearing element of FIG. 9a;

FIG. 9d shows a perspective view of the one-piece bearing element of FIG. 9a with a bow spring and FIG. 9e shows a view of a section of the bearing element of FIG. 9a.

DETAILED DESCRIPTION OF THE INVENTION

Figure 1:
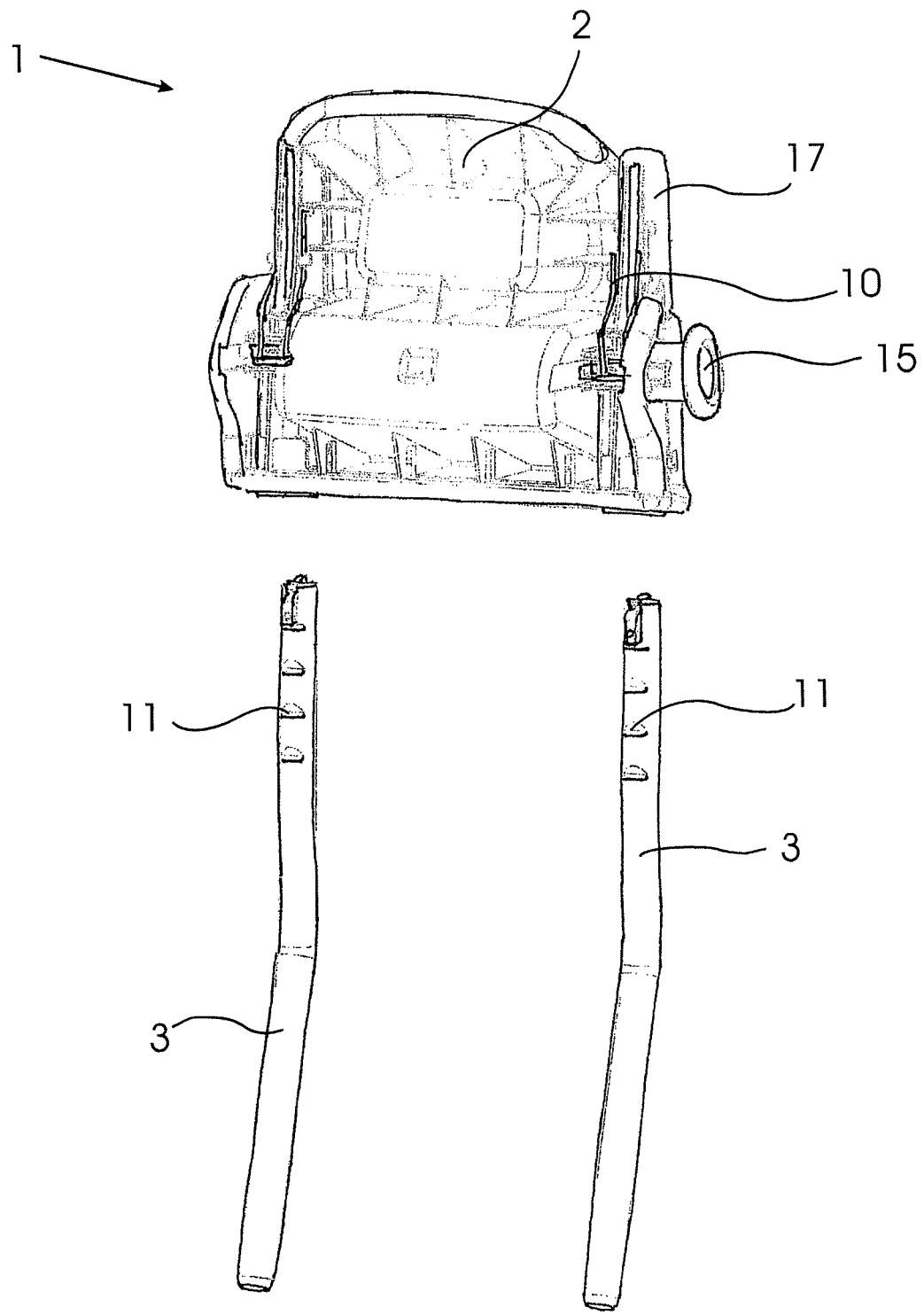
FIG. 1 shows a perspective view of an upholstery support with associated support rods in a dismantled position.

The principal construction of a headrest 1 formed from an upholstery support 2 and two support rods 3 is shown in FIG. 1, the upholstery support 2 in the end state comprising an upholstery portion, which is not shown here and only by way of indication in FIGS. 2-5.

The support rods 3 are fastened with their ends opposing the upholstery support 2 in a backrest of a motor vehicle seat, not shown here. For adjusting a headrest 1 relative to the backrest, the upholstery support 2 has receivers 17 which are configured according to the support rods 3, and which permit a displacement of the upholstery support 2 along the support rods 3. For securing the position of the headrest 1 in a predetermined position, a locking spring 10 is arranged on the upholstery support 2 and which may be brought into engagement with a central latching portion with latching marks arranged on the support rod 3. For releasing the connection of the locking spring 10 with the latching marks 11 an actuating slide 19 is provided which by a displacement thereof causes the locking spring 10 to move into a position in which said locking spring comes out of engagement with the latching marks 11.

Figure 2:
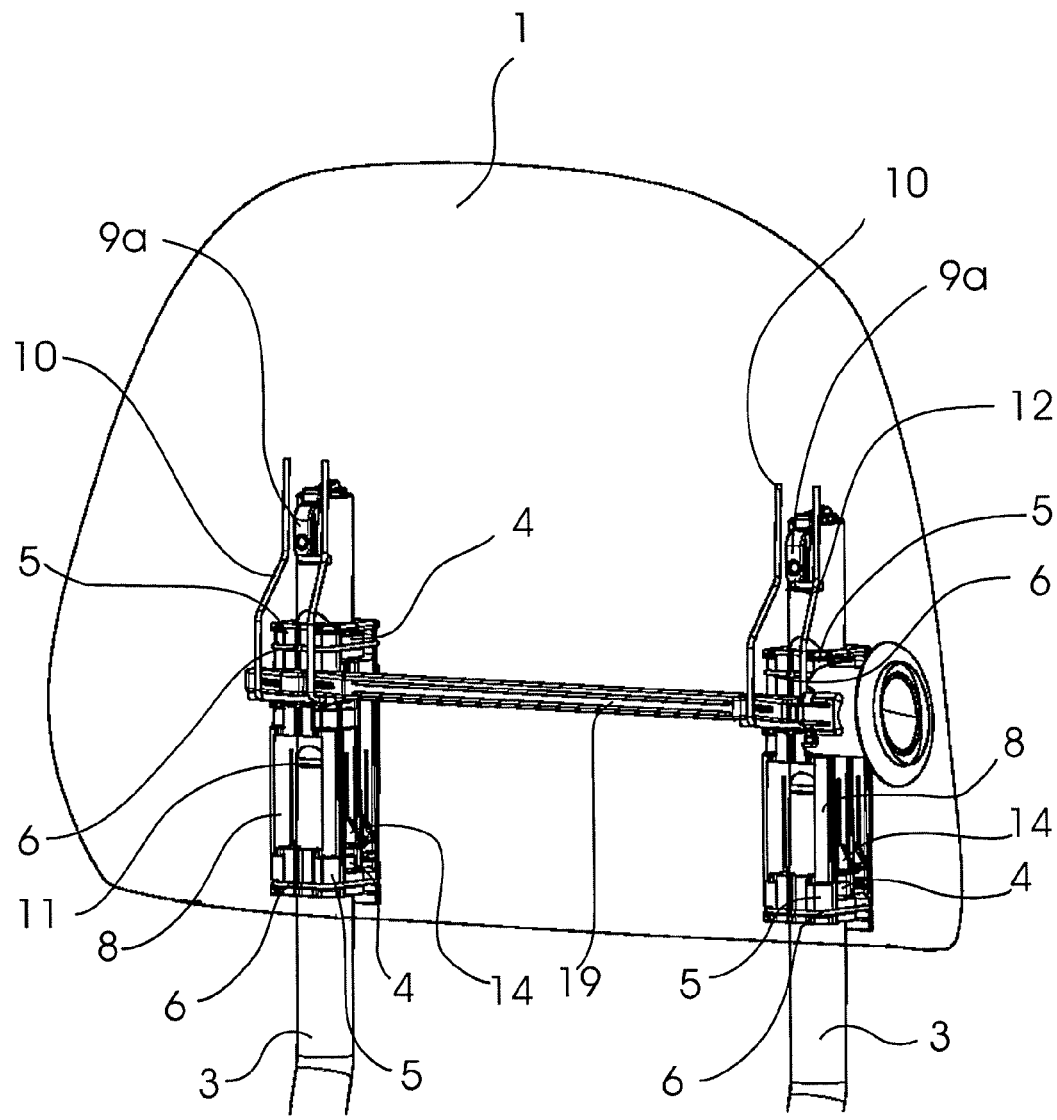
FIG. 2 shows a perspective view of a first embodiment of a headrest.
Figure 3:
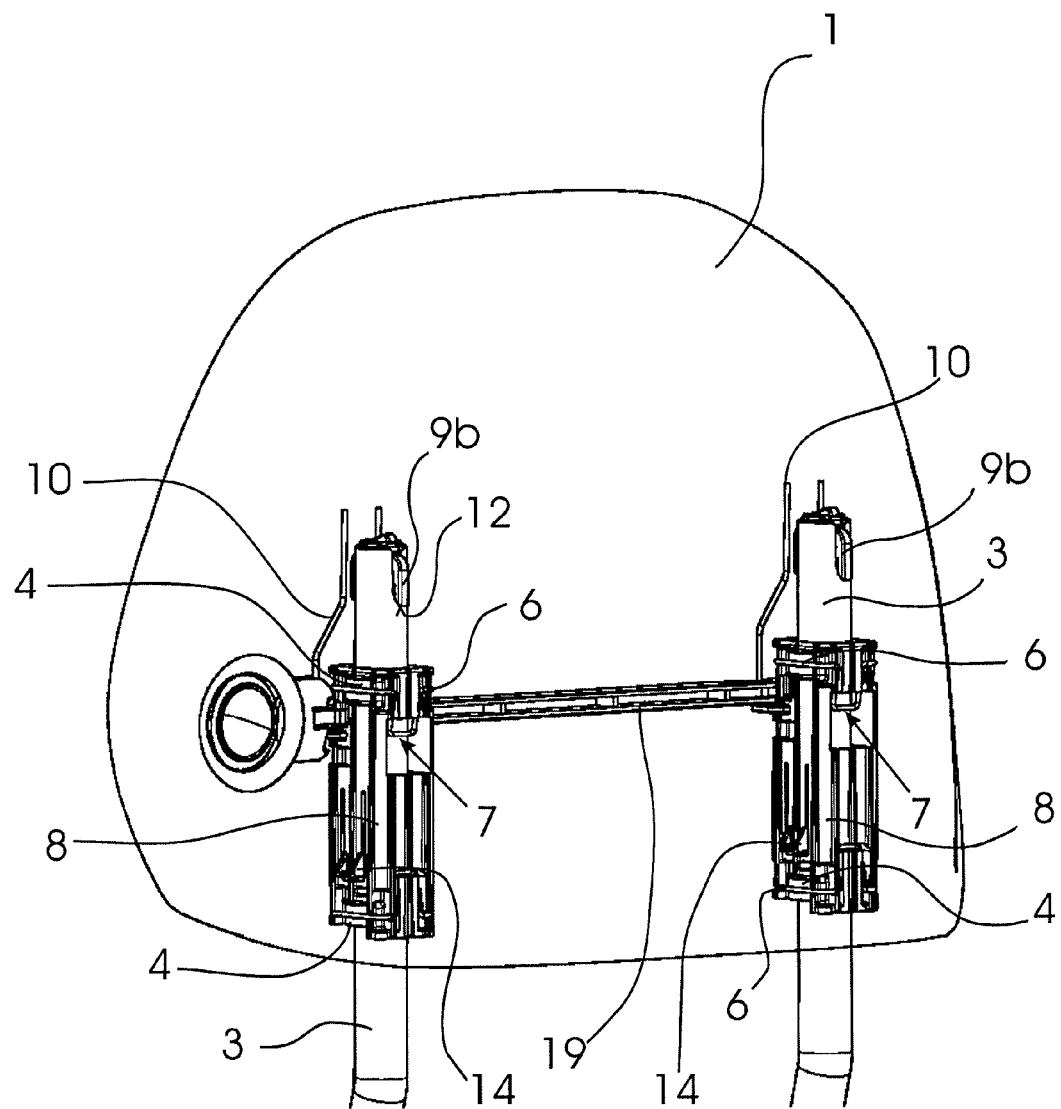
FIG. 3 shows a further perspective view of the headrest of FIG. 2.

For illustrating the mode of operation of a first embodiment of a headrest 1 shown in FIGS. 2 and 3, said headrest is shown with the upholstery support 2 omitted. In the mounted state, two bearing bushes 8 are fixed in position on the upholstery support 2, for which said bearing bushes 8 comprise laterally protruding latching projections 14, which engage in correspondingly configured openings on the upholstery support 2. The bearing bushes 8 are in this case provided with channels along the length and arranged on the upholstery support 2 such that the upholstery support 2 may be displaced along the support rods 3.

In the region of its opposing ends, the bearing bush 8 has a frame element 5 configured integrally with the bearing bush 8, and which is connected to a bearing element configured as an annular body 4. The contact surfaces between the bearing bush 8 and the support rod 3 are formed by guide webs 20 which, arranged inside the annular body 4, rest against the surface of the support rod 3. Thus the annular body 4 has on its inner face which faces the support rod 3 four guide webs 20 which are arranged in a distributed manner and which rest in a linear manner against the support rod 3. For the compensation of play, the annular body 4, which is open on one side and thus is elastically adjustable, is pretensioned by a spring element configured as a bow spring 6 in the direction of the support rod 3. In an embodiment of the annular body 4, not shown here, with a smaller internal diameter than the external diameter of the support rod 3, a bow spring 6 may be dispensed with, as then the annular body 4 rests against the support rod 3 due to its elasticity. The two annular bodies 4 are in this case arranged on the bearing bush 8 offset by 180° or respectively rotated relative to one another in the longitudinal axial direction, so that the annular bodies 4 together radially exert a uniform pressure on the support rod 3.

The bow spring 6 is bent so that it protrudes with a stop region 7 through an opening in the bearing bush 8 in the direction of the support rod 3, so that with a displacement of the bearing bushes 8 together with the upholstery support 2 as far as an upper end position, the stop regions 7 come into contact with a stop 12 arranged on a projection 9b, which fixes the upper end position of the headrest 1.

The projections 9a, 9b, arranged diametrically in the region of the free ends of the support rod 3, have a variable width and in addition to providing an end stop 12 by means of the projection 9b for the stop region 7 of the bow spring 6, also serve for securing against rotation, for which the receiver 17 of the upholstery support 2 has correspondingly configured grooves. In order to permit a displacement of the upholstery support 2 provided with the bearing bushes 8, the bearing bushes 8 also comprise grooves 25a, 25b configured according to the projections 9a, 9b and configured to have different widths, which permit a displacement of the bearing bushes 8 over the projections 9a, 9b. The embodiment of the projections 9a, 9b to have different widths forms, together with the correspondingly configured grooves 25a, 25b on the bearing bushes 8, a poka yoke system, which prevents the headrest 1 respectively the upholstery support 2 from being positioned with incorrect orientation on the support rods 3.

Figure 4:
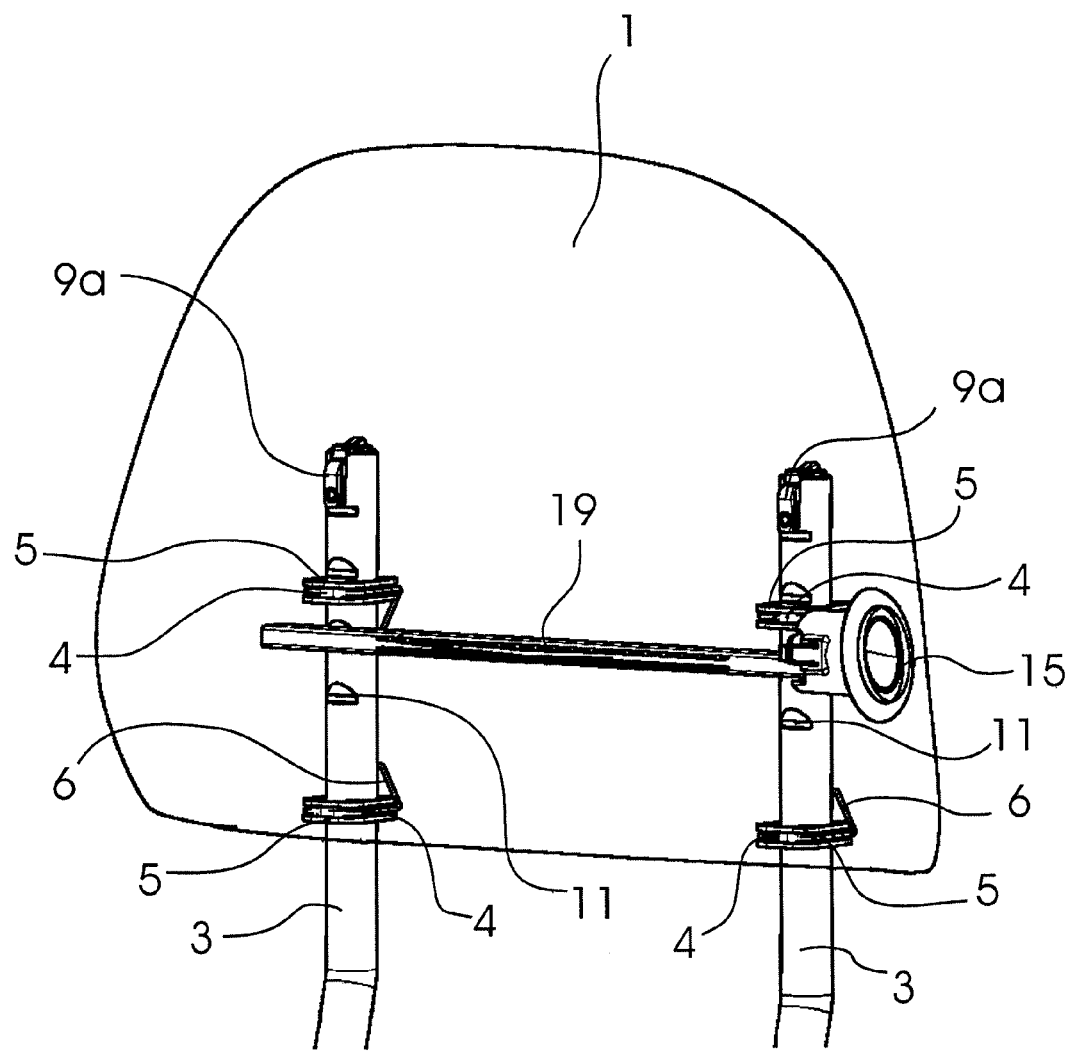
FIG. 4 shows a perspective view of a second embodiment of a headrest.
Figure 5:
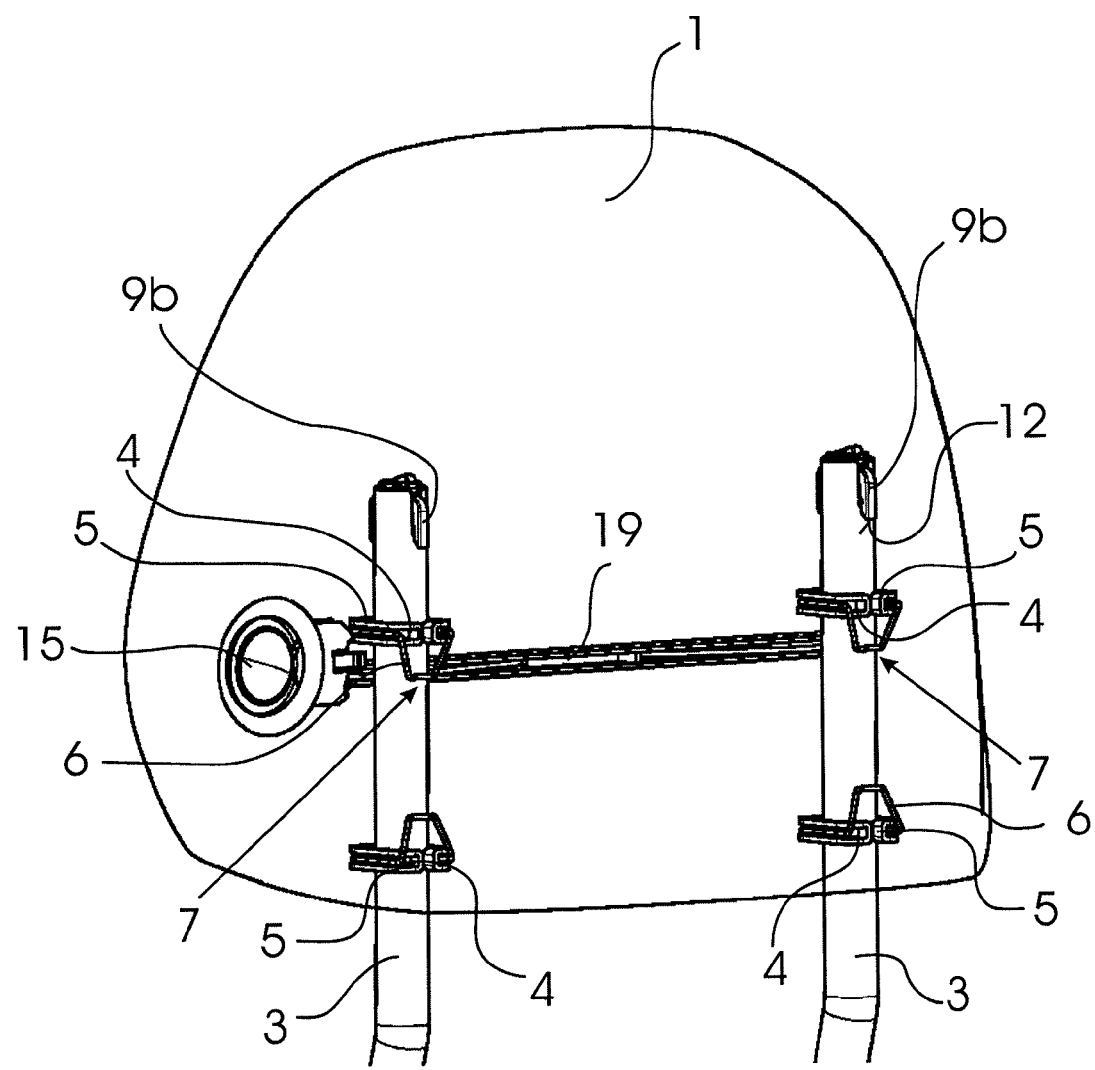
FIG. 5 shows a further perspective view of the headrest of FIG. 4.
Figure 6:
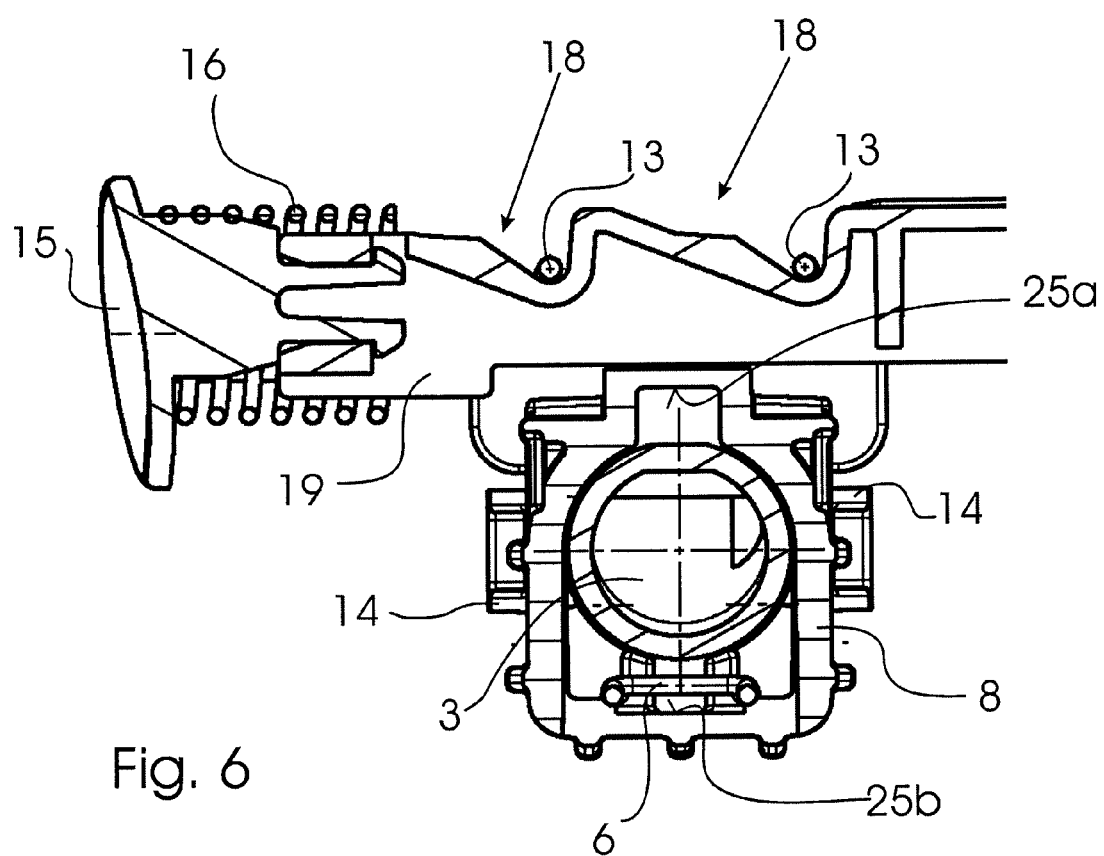
FIG. 6 shows an enlarged view of a section through the headrest of FIG. 2 along an unlocking slide.

According to a further embodiment of the headrest 1 shown in FIGS. 4 and 5, the bearing elements configured as annular bodies 4 are not arranged together on a bearing bush 8 but as components which may be arranged individually on the upholstery support 2, which may be inserted into corresponding receivers, not shown here, on an upholstery support.

The annular bodies 4 shown in FIGS. 9a-9e have an opening 21, by means of which said annular bodies have a U-shaped design. Due to the opening 21, the annular body 4 has an elasticity in the radial direction relative to the support rod, which makes it possible to pretension the annular body 4 by applying the bow spring 6 in the direction of the support rod 3, so that the guide webs 20 arranged on the inner surface of the annular body 4 rest against the support rod 3.

The arrangement of the individual annular bodies 4 on the upholstery support 2 is such that the annular bodies 4 are clamped in a corresponding receiver on the upholstery support 2 in order to avoid rattling noise, but also so that the radially oriented adjustability of the free limbs is ensured.

The annular bodies 4 are pretensioned in a similar manner by bow springs 6 which rest against the outside of the annular bodies 4 in a groove-shaped recess and which, moreover, also have a stop region 7 which serves for limiting the extending movement of the headrest 1, by said stop region coming into engagement with an end stop 12 on the projection 9 in the upper end position.

As also shown in FIGS. 2 and 3 in the embodiment of the headrest 1, the embodiment shown in FIGS. 4 and 5 also has latching marks 11 which cooperate with a locking spring 10, not-shown here, in the manner shown in FIGS. 2 and 3, in order to ensure the fixing of the position of the headrest 1.

For adjusting the headrest 1 in the direction of the backrest it is necessary for the locking spring 10 to be brought out of engagement with the latching marks 11. To this end, the exemplary embodiments shown in FIGS. 2 and 3 and 4 and 5 have identical actuating slides 19 which may be actuated via an operating button 15 arranged on the outside of the headrest 1. The actuating slide 19 has ramp-like recesses 18, in which the free ends 13 of the locking spring 10 rest in a latched position. A longitudinal displacement of the unlocking slides 19 by actuating the actuating button 15 causes the free ends 13 of the locking spring 10 to rise in the recesses 18 so that the locking spring 10 is raised by the support rod 3. In so doing, the locking spring 10 comes out of engagement with the latching marks 11, so that a free displacement of the upholstery support 2 relative to the support rods 3 is possible. The embodiment of the ramp-like recesses 18 with two regions of different gradient, has the effect that an alteration to the actuation force may be perceived by the operator when the free ends 13 pass from the steep region into the flat region of the recesses 18. The operator thus knows when the unlocking has taken place, which occurs when the actuating force for adjusting the actuating button 15 is reduced due to the flatter path.

Figure 7:
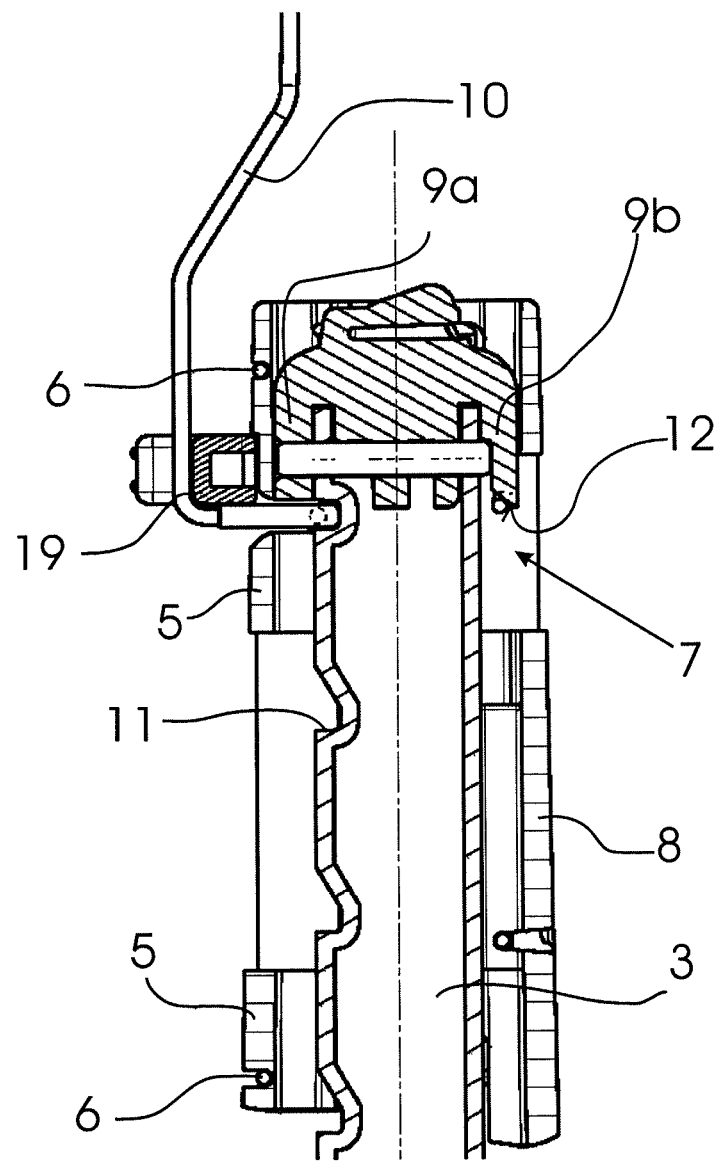
FIG. 7 shows a view of a section along a free end of a support rod of the headrest of FIG. 2 in a locked position.
Figure 8:
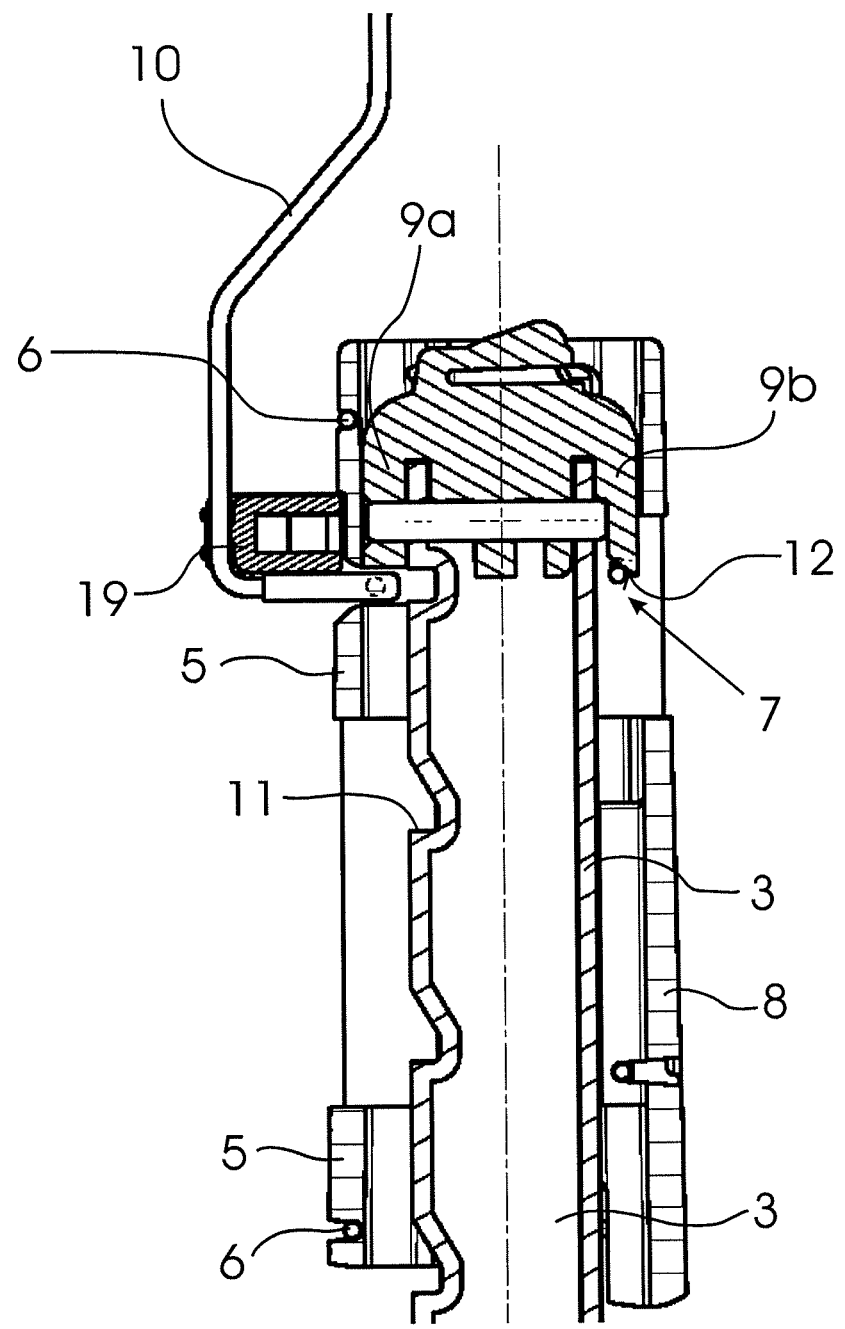
FIG. 8 shows a view of the section of FIG. 7 in an unlocked position.
Figure 9A:
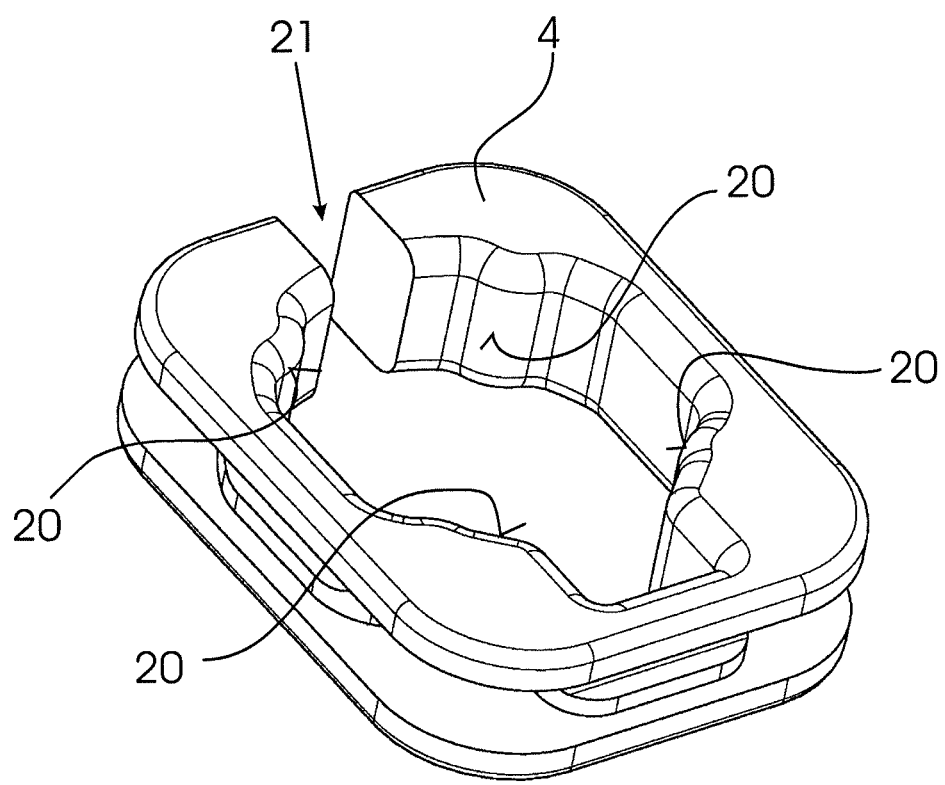
FIG. 9a shows a perspective view of a one-piece bearing element.
Figure 9B:
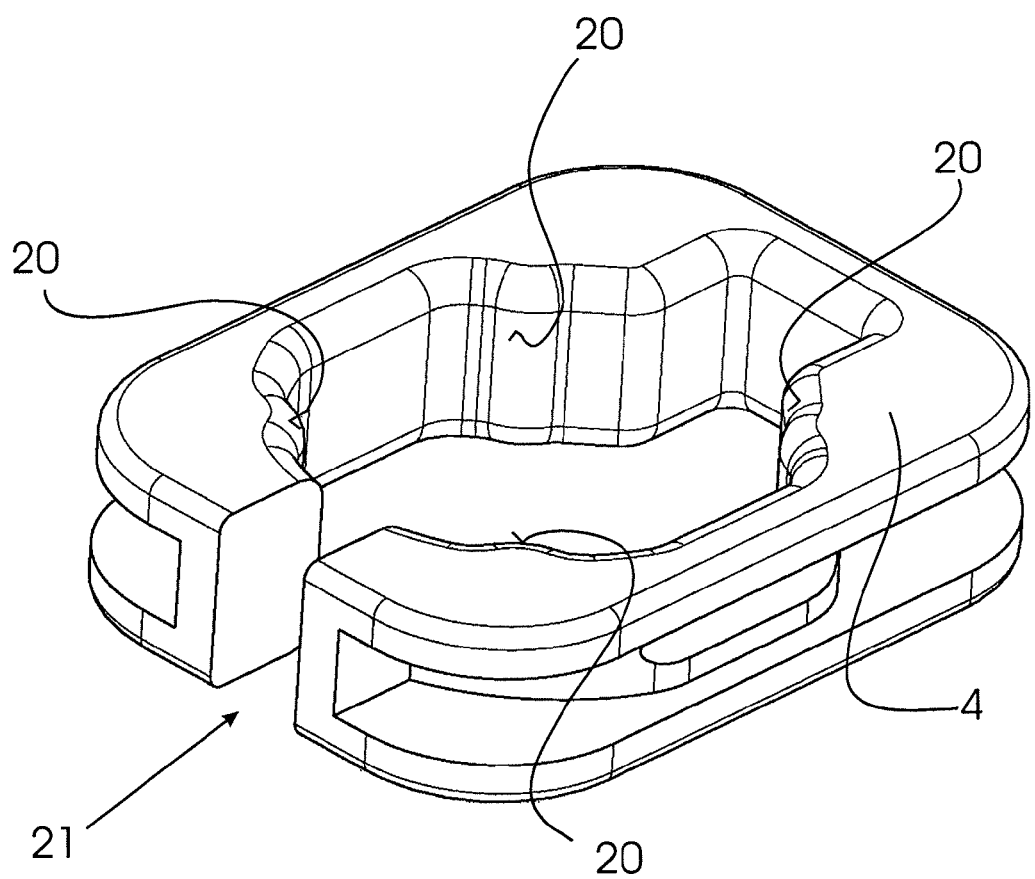
Figure 9C:
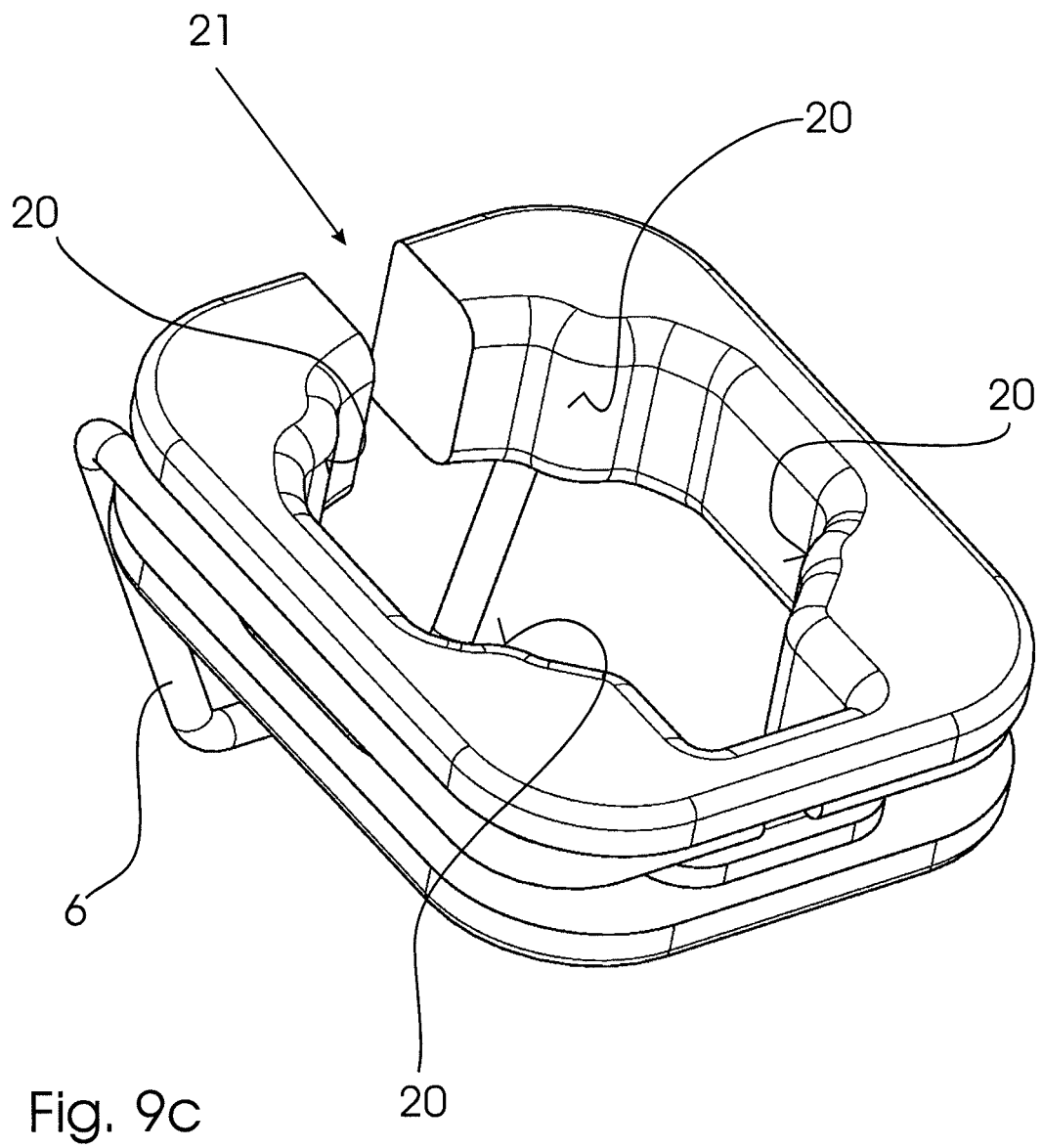
FIG. 9c shows a perspective view of the one-piece bearing element of FIG. 9a with a bow spring.
Figure 9D:
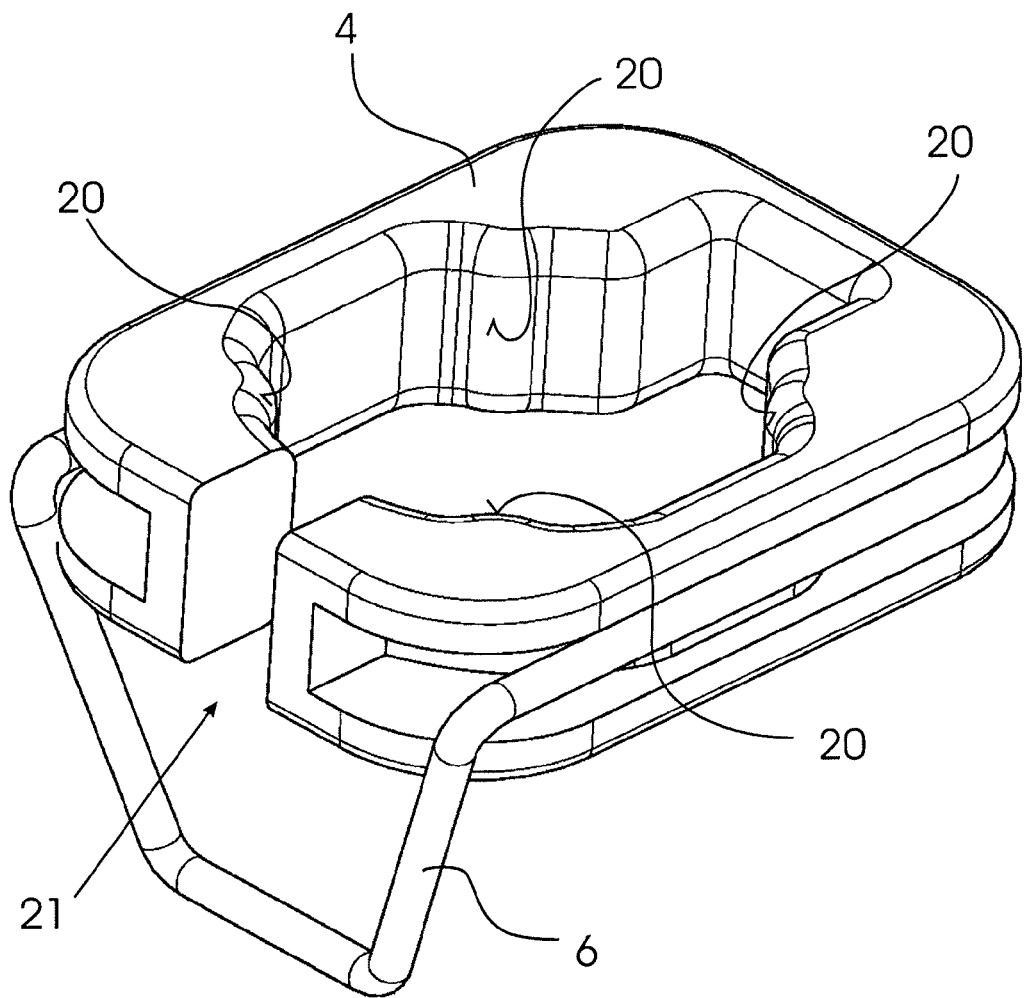
Figure 9E:
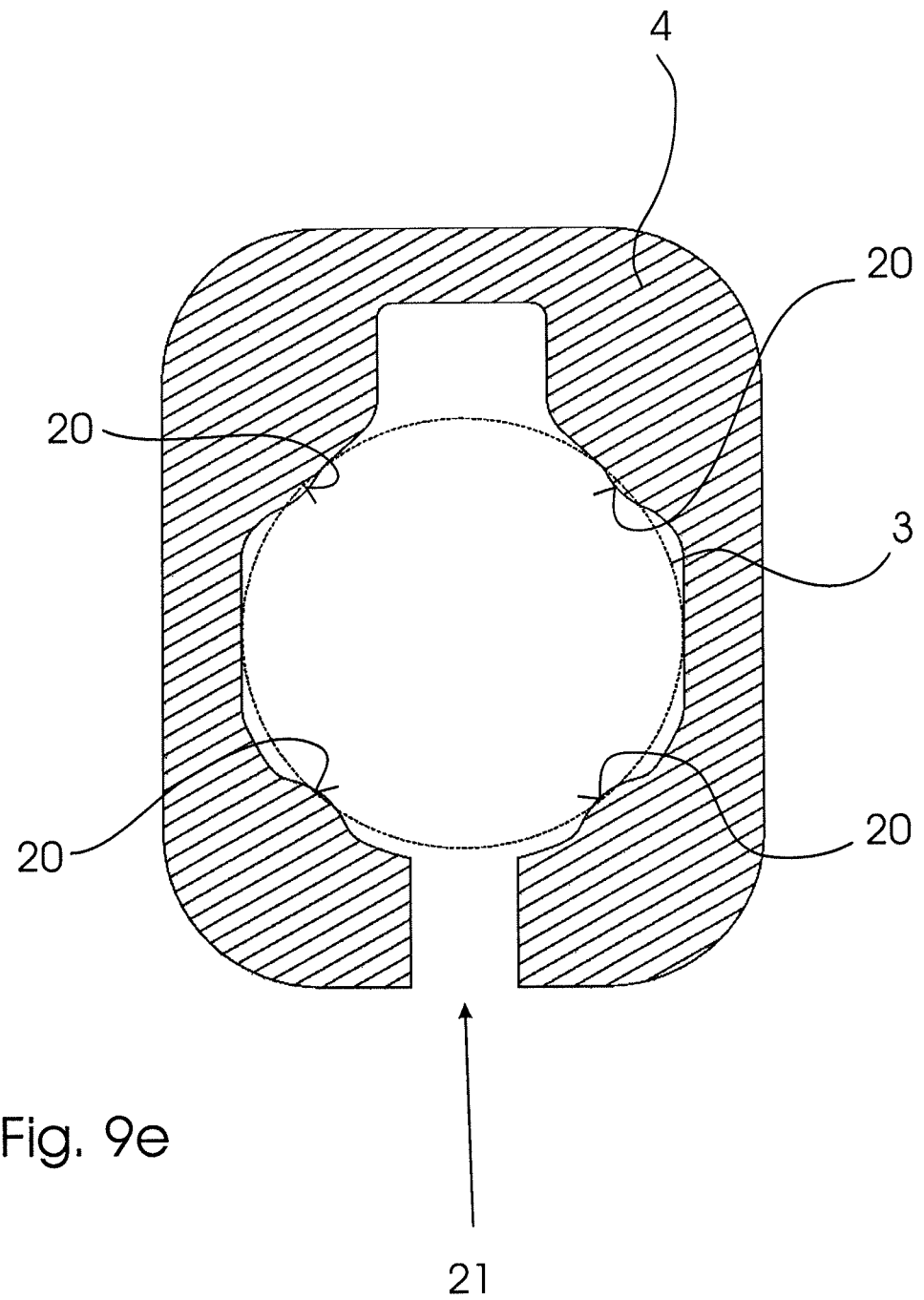

A helical compression spring 16 supported at one end on an underside of the actuating button 15 and at the other end on the upholstery support 2 ensures that, after actuation of the actuating slide 19, said actuating slide automatically reaches a position in which the locking spring 10 rests against the support rod 3 and at a predetermined point once again comes into engagement with the latching marks 11 (see FIGS. 7 and 8).

We claim:

1. A headrest for motor vehicle seats, comprising
an upholstery support,
a support rod having a free end displaceably arranged relative to the upholstery support, connecting the headrest to a backrest of the motor vehicle seat, the free end comprises a projection having an end stop and protruding from the support rod and which is displaceably mounted in a corresponding receiver on the upholstery support and
at least two bearing elements arranged in the longitudinal axial direction of the support rod, spaced apart from one another on the upholstery support and at least partially encompassing the support rod, for guiding the support rod, the bearing elements being elastically pretensioned in the direction of the support rod,
wherein the bearing elements
are formed by an annular body comprising an opening which is preferably connected in its region opposing the opening to a frame element which is connected to the upholstery support
comprise guide webs distributed over their inner periphery, protruding toward the support rod and extending in the longitudinal axial direction of the support rod, and
the bearing element on its inner periphery has four guide webs, wherein the annular body comprises two guide webs arranged adjacent to the opening as well as two guide webs arranged adjacent to the connecting region with the frame element which are arranged in a uniformly distributed manner.

2. The headrest according to claim 1, wherein the bearing element is pretensioned by a spring element acting externally thereon in the directions of the support rod.

3. The headrest according to claim 1 wherein the bearing elements are arranged offset by 180° relative to one another.

4. The headrest according the claim 2, wherein the spring element is formed by a bow spring.

5. The headrest according the claim 2, wherein the spring element has a stop region which protrudes in the direction of the support rod such that it cooperates in an upper end position of the headrest with an end stop arranged on the support rod.

6. The headrest according to claim 1, wherein the guide webs are of arcuate configuration in cross section.

7. The headrest according to claim 1, wherein the bearing elements are arranged on a bearing bush which is connected by a positive material connection to the upholstery support.

8. The headrest according to claim 1, further comprising locking spring arranged on the upholstery support which rests against the support rod with a latching portion which is pretensioned in the direction of the support rod such that the latching portion is brought into engagement with a latching mark arranged on the support rod.

9. The headrest according to claim 8, wherein the locking spring rests against an actuating slide which is configured such that an axial displacement of the actuating slide causes the locking spring to shift from a latched position into a released position.

10. The headrest according to claim 1, wherein the bearing elements are arranged offset by 180° relative to one another.

11. The headrest according to claim 1, wherein the guide webs are of arcuate configuration in cross section.

12. The headrest according to claim 1, wherein the bearing elements are arranged on a bearing bush which is connected by a positive and/or material connection to the upholstery support.

* * * * *